(No Model.)

N. NILSON.
AUTOMATIC PIPE COUPLING.

No. 427,520.  Patented May 6, 1890.

Witnesses
J. Jessen.
C. L. Nachtrieb.

Inventor
Nils Nilson

By Paul, Sanford & Merwin Attys

UNITED STATES PATENT OFFICE.

NILS NILSON, OF MINNEAPOLIS, ASSIGNOR TO THE NORTHWESTERN MODERN CAR HEATING AND LIGHTING COMPANY, OF ST. PAUL, MINNESOTA.

AUTOMATIC PIPE-COUPLING.

SPECIFICATION forming part of Letters Patent No. 427,520, dated May 6, 1890.

Application filed September 10, 1888. Serial No. 284,995. (No model.)

*To all whom it may concern:*

Be it known that I, NILS NILSON, of Minneapolis, in the county of Hennepin and State of Minnesota, have invented certain Improvements in Automatic Pipe-Couplings, of which the following is a specification.

My invention relates to improvements in a device for securing together two sections of pipe between the cars of a railway-train in such a manner that should the cars become detached the pipes will be automatically uncoupled; and the object I have in view is to provide a coupling made in halves, each half attached to one end or extremity of the pipe to be coupled and securely supported and locked together, but readily released without damage to the pipe.

My invention consists, generally, in the construction and arrangement hereinafter described, and particularly pointed out in the claim.

Figure 1:
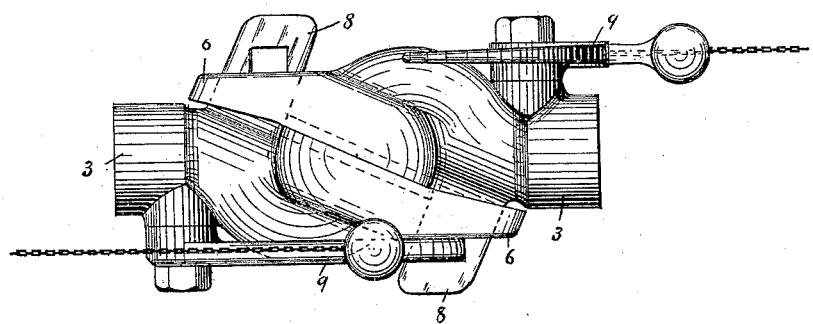
Figure 2:
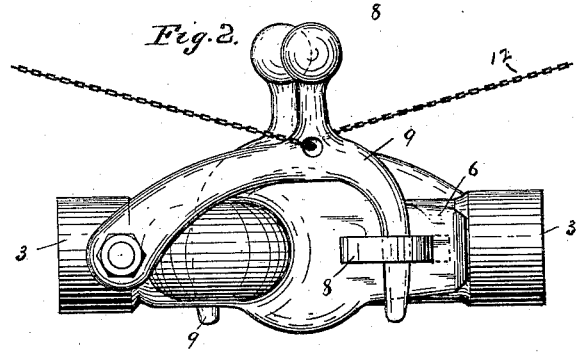
Figure 3:
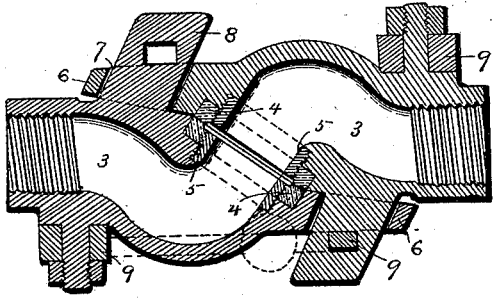

In the drawings which form a part of this specification, Figure 1 is a plan of the coupler; Fig. 2, a side elevation thereof; Fig. 3, a longitudinal section.

3 3 represent the two halves of the coupling, which are made exact counterparts of each other, and the faces are arranged to be brought together on a horizontal angle in order that they may be readily separated. A packing-ring 4, of some suitable flexible material, is placed about the central opening in each half of the coupling and is received by a suitable recess formed for this purpose. The interior surface of the central opening is preferably screw-threaded and receives a screw-threaded collar or fitting 5. The outer extremity of this fitting bears against the packing-ring 4 to hold it in position. The outer circumference of the collar which thus bears against the packing-ring may be made slightly cone-shaped, diverging outwardly, so that as the collar is screwed into the coupling the packing-ring will be compressed and the outer or free surface caused to project, and any wear which may occur upon the ring is thus taken up. When the two halves of the coupling are placed together, the rings 4 bear against each other and form a tight joint.

A suitable catch 9 may be placed upon each half of the coupling and caused to engage a projecting end upon the opposite half, and thus securely hold the two halves together. This projecting end 6 may also be provided with a slot 7, which is arranged to fit over a staple or pin or guide 8 to form a better support for the two parts of the coupling and relieve the joint from strain. The catch is preferably pivoted to the coupling, and may be connected by means of a chain or cord 12 to the car. A sufficient amount of slack is given to the chain or cord to allow it to accommodate itself to the ordinary movement between the cars without bringing a strain upon the catch. If, however, the cars become detached from each other, the coupling will remain in position while the cars are separating until the movement of the car has taken up the slack in the chain. Tension will then be brought upon the chain and the catch drawn out of engagement with the opposite half of the coupling and the two halves will be free to separate.

The catch 9, as illustrated, is made in the form of a hook. It is pivoted to one half of the coupling and projects longitudinally with this half, and the hook-shaped end passes downward and bears against the outer surface of the projecting end of the same. The hook-shaped end of the catch is received in a suitable aperture formed in the staple or pin 8 upon the opposite half of the coupling.

When the two halves of the coupling are placed together, the staple or pin 8 projects through the slot 7 and the catch 9 will drop into the aperture in the said staple or pin, thus preventing the staple or pin from being drawn out of the slot. The end of the catch 9 which fits in the aperture of the said staple or pin may be made slightly tapering, in order that as it is forced down the two halves will be drawn more closely together. A handle may be provided upon the catch for convenience in operating it, and a chain for automatically releasing is attached to the said catch at some convenient point, and the opposite end is secured to the car.

I claim as my invention—

In a pipe-coupling, the combination, with the two halves of the coupling, the angular faces of which are brought together and form a close joint, of a projection upon one half of the coupling formed with a slot, a slotted staple secured to the opposite half of the coupling and entering the slot of said projection, and a catch pivoted upon one half of the coupling and entering the slot of the staple upon the opposite half and bearing against the projection on the half to which the catch is secured to lock the parts together, substantially as and for the purposes set forth.

In testimony whereof I have hereunto set my hand this 9th day of June, 1888.

NILS NILSON.

In presence of—
   R. H. SANFORD,
   C. L. NACHTRIEB.